May 10, 1966  O. REDER  3,250,238
TRANSPORTABLE OBSERVATION STATION
Filed Oct. 22, 1964  2 Sheets-Sheet 1

INVENTOR.
Otto Reder
BY

May 10, 1966     O. REDER     3,250,238
TRANSPORTABLE OBSERVATION STATION
Filed Oct. 22, 1964     2 Sheets-Sheet 2
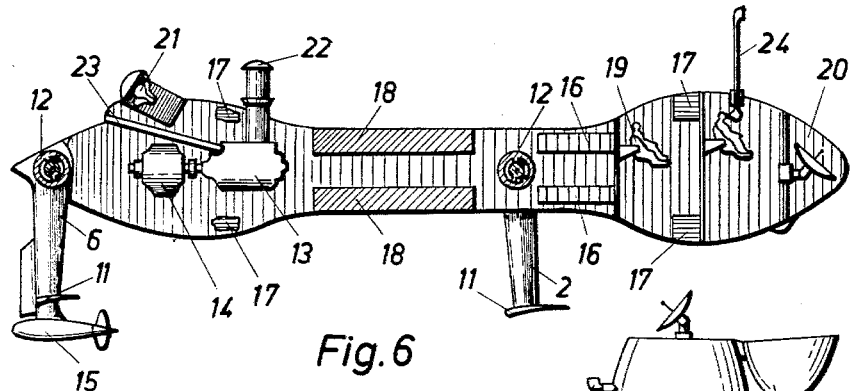
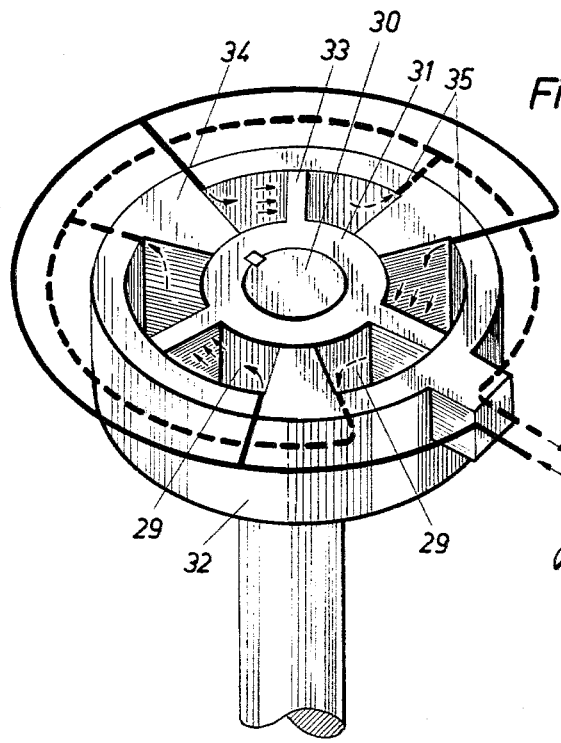
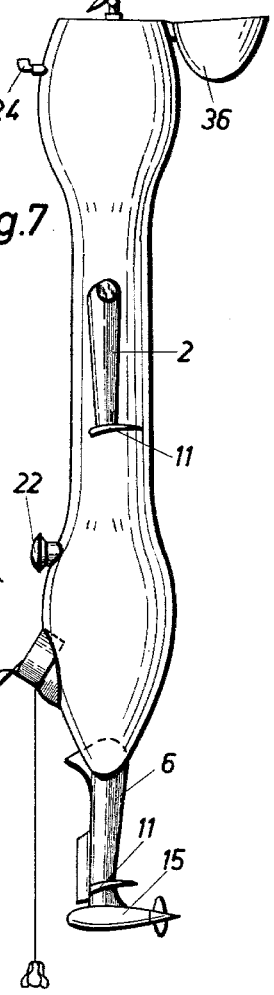
INVENTOR.
Otto Reder
BY United States Patent Office 3,250,238
Patented May 10, 1966

3,250,238
TRANSPORTABLE OBSERVATION STATION
Otto Reder, Bremen-Lesum, Germany, assignor to Vereinigte Flugtechnische Werke Gesellschaft mit beschrankter Haftung fruher "Weser" Flugzeubau Focke-Wulf Heinkel-Flugzeugbau, Bremer, Germany
Filed Oct. 22, 1964, Ser. No. 405,901
Claims priority, application Germany, Oct. 24, 1963, W 35,502
12 Claims. (Cl. 114—16)

The present invention relates to a transportable or amphibious observation station. Observation stations on the surface of the water, sometimes called "ocean platforms" or "ocean stations" are known. Thus, for instance, ocean stations have become known which comprise observation installations such as radar installations and personnel platforms with personnel quarters, which platforms are carried by stilts equipped with floats and deeply immersed in the water. Stations which, for all practical purposes are stationary, are employed for tracking air and space vehicles.

Another water observation station for the same purpose has been suggested which consists primarily of a cylindrical hollow body of considerable length having one end provided with a platform comprising observation installations and personnel quarters. A station of this type is moved in horizontal position to its place of employment and there is turned into a vertical position by flooding certain chambers, so that the platform protrudes from the water, whereas the hollow body is deeply immersed in the water. By blowing out the chambers by means of compresssed air, it is possible to change the location of the station from its vertical position back to its horizontal position and then to move the station to another place of employment.

The lack of movability and the rather awkward and time-consuming operations for placing the heretofore known observation stations of the above mentioned type into readiness represent considerable drawbacks which prevent the employment of such observation stations for many purposes, especially for military purposes.

It is, therefore, an object of the present invention to provide an amphibious observation station which will overcome the above mentioned drawbacks.

It is another object of this invention to provide an amphibious observation station which can easily and quickly be brought into readiness wherever desired and can likewise be easily and quickly removed from its last place of employment to another place of employment.

It is also an object of this invention to provide an observation station as set forth above which in case of need can be quickly hidden from enemy observation.

These and other objects and advantages of the invention will appear more clearly from the following specification in connection with the accompanying drawings, in which:

FIG. 1 diagrammatically illustrates an observation station according to the present invention in floating position either prior to assuming its observation position or prior to its fast takeoff.

Figures 4, 5:
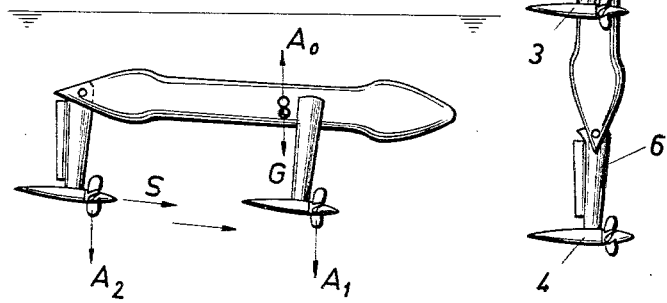
FIG. 4 is a diagrammatic representation of the observation station in its position of observation.

FIG. 5 diagrammatically illustrates the observation station according to the present invention in fully submerged position.

FIG. 6 illustrates on a somewhat larger scale than FIGS. 1 to 5 a diagrammatic section through an observation station according to the invention while on a fast takeoff or travelling with its main body just above the water.

FIG. 7 diagrammatically illustrates the observation station of FIG. 6 in its position of observation with the dome opened and the radar and sonar or sound devices in position of action.

FIG. 8 diagrammatically shows a rotary-vane device which may be used in connection with the present invention.

The observation station according to the present invention is primarily a "flying" speed boat or a hydrofoil ship which is adapted in a manner known per se during its travel to be lifted out of the water by hydrodynamic lift producing means such as lifting surfaces or propellers and thereby is able to obtain high travelling speeds. The bow of the vehicle is designed as observation stand.

According to the present invention, the lift producing and propelling means of the ship are movable in the longitudinal direction of the vehicle in such a way that by movement of the lift producing and propelling means toward the stern, the center of gravity of the vehicle will be displaced to such an extent that the vehicle will turn about its transverse axis so as to move from its horizontal travelling position into a vertical stationary position of observation.

The present invention in this way creates a stable amphibious observation station of high mobility inasmuch as the vehicle can very quickly move on its own from one place of employment to another place where it can likewise very quickly and in an extremely simple manner be brought into its position of observation. If the stern of the vehicle is provided with sound or sonar buoys adapted easily to be brought into action, the observation station according to the present invention can also advantageously be employed as a link in a submarine warning system.

Referring now to the drawings in detail, the observation station shown therein comprises primarily a fuselage 1 to the front part of which are pivotally connected supports 2 carrying lift producing propellers 3. Similarly, the stern of the fuselage has pivotally connected thereto support 6 carrying stern propellers 4. More specifically, supports 2 are connected to supporting shafts 5 extending transversely to the longitudinal axis of the fuselage. Means, which will be referred to in detail further below, are provided for turning the supporting shaft so that supports 2 with the lift producing propellers 3 can be tilted to a position in which they are substantially parallel and co-extensive with regard to each other as shown, for instance, in FIG. 4. Support 6 is connected to a transverse shaft 7, and means are provided for turning transverse shaft 7 so that also support 6 with its propeller 4 can be tilted into axial alignment with the fuselage 1.

Figure 3:
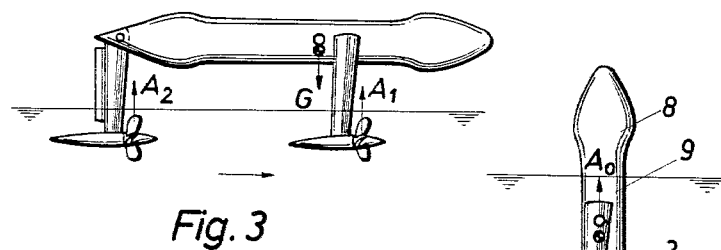
FIG. 3 shows the observation station according to the invention during a fast takeoff.

When the propeller shafts have a positive angle of incidence, the vehicle will travel forwardly and in a manner known per se, will be lifted out of the water, as shown in FIG. 3. In this position, the observation station can at high speed travel to its desired place of employment. When the vehicle has arrived at its place of employment, the propelling and lift producing propellers are stopped, and the vehicle resumes its floating position shown in FIG. 1. When now supports 2 and 6 with propellers 3 and 4 are tilted or turned toward the stern, the center of gravity G of the vehicle will, relative to its center of lift or buoyancy $A_0$ be displaced toward the stern in such a way that the vehicle will start turning about its transverse shaft. After supports 2 and 6 have been turned so that their longitudinal axes are in substantially parallel alignment with the longitudinal axis of the fuselage, the vehicle has turned into its vertical position shown in FIG. 4. In this position, the bow of the vehicle protrudes from the water. The observation installations which will presently be described, such as radar antennas and optical measuring devices, can now be moved into their position of action and be operated.

FIG. 6 shows the interior of the vehicle and also the actuating means for turning supports 2 and 6. More specifically, the supports 2 and 6 carry the water lifting surfaces or water wings 11 which have a super-cavitating profile. Supports 2 and 6 are adapted to be turned or tilted by a hydraulic tilting and control device 12 which may, for instance be a rotary vane system diagrammatically illustrated in FIG. 8. This rotary vane device comprises a rudder stock 30 firmly fitted to a vane supporting hub 31 within a housing 32. Vanes 33 together with partitions 34 of the housing form a plurality of pressure chambers which are each successively interconnected by annular passages or ducts 35. The pressure chambers are, through oil connections, connected to the pressure and suction side of a pump. When oil under pressure is conveyed to one connection, the vanes yield to the pressure and turn the hub. A corresponding quantity of oil is discharged from the opposite chambers and flows to the suction side of the pump.

It will thus be seen that by means of the said rotary vane device the supports 2 and 6 can be tilted and can be held hydraulically in their respective desired positions. It is, of course, to be understood that this rotary vane device for turning supports 2 and 6 has been shown merely by way of example and that also other turning devices can be used for the same purpose.

The said rotary vane device serves not only for tilting the supporting surfaces and propellers but also controls the positive and negative angle of incidence thereof.

The arrangement shown in FIG. 6 furthermore comprises a diesel electric drive motor 13 having operatively connected thereto a generator 14 for driving the propeller motors and for charging the batteries. The arrangement also comprises an electric motor 15 for driving the propellers. The mounting of the electric motor 15 in the gondola yields a particularly favorable weight location for tilting the observation station according to the invention. The reference numeral 16 designates batteries which may also be employed as source of energy for underwater traveling. The observation station as shown in FIG. 6 furthermore comprises trimming tanks 17 which may also be employed as diving tanks. Near the center of gravity of the observation station, when the latter is in its horizontal position, there are provided fuel tanks 18. The personnel quarters are in the bow, which has tiltable seats 19 for the observation personnel. Also arranged in the bow is a radar installation which is located below a hood 36 adapted selectively to be opened and closed. The reference numeral 21 designates a sonar or sound measuring device which is adapted selectively to be moved out of the observation station. The observation station furthermore comprises an air intake or breathing mast 22, an exhaust 23 adapted to be closed by a valve, and a periscope 24, said air intake mast and periscope being selectively moved outwardly or to be withdrawn into the fuselage.

Figures 1, 2:
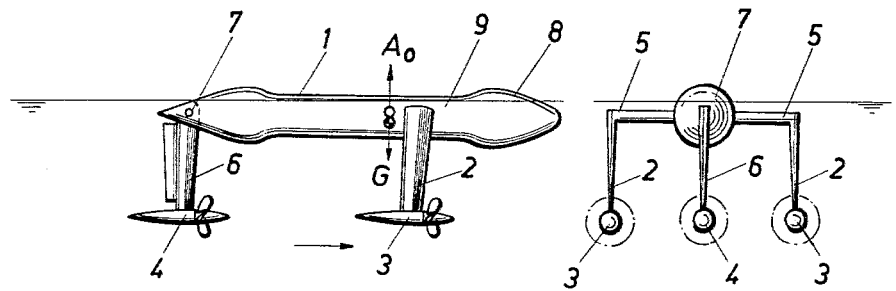
FIG. 2 is a rear view of FIG. 1.

It will be appreciated that the low location of the center of gravity makes the vehicle non-sensitive to a high degree against disturbances of the water, such as storm and high sea. In order to reduce the diving movements at high sea, the fuselage according to the invention may have a restriction 9 along the waterline. It will thus be seen that the platform according to the present invention is very stable and thus permits precise observations and tracking. By tilting supports 2 and 6 into their positions perpendicular to the longitudinal axis of the fuselage as shown in FIG. 1, the vehicle can in a minimum of time be brought into its horizontal position and can be started for a fast takeoff.

If, in view of imminent danger a quick immersion of the vehicle is required, this can be realized by adjusting the propeller shafts to a negative angle of incidence whereby an immersing or downwardly directed force will be obtained which suffices to press the vehicle below the water surface. When the remaining lift of the vehicle is selected small, small floodable diving tanks may be provided for permitting the vehicle to remain underwater in a rest position for a longer period of time. Such tanks may simultaneously serve as trimming tanks to compensate for the loss of weight due to consumed fuel.

It is a matter of course that in addition to devices for observation, the bow may also contain equipment for special purposes such as for shooting down air vehicles and guiding weapons. In this instance, it is possible, by partially tilting the lift producing and driving means, to maintain the vehicle at a certain angle with regard to the vertical in such a way that the longitudinal axis of the vehicle will form an angle with the horizontal which corresponds to the angle of elevation required for the shooting down of the respective enemy vehicle.

The turning or tilting of supports 2 and 6 for displacing the center of gravity does not necessarily have to be brought about by turning the entire transverse shafts 5 and 7. For instance, said supports may be rotatably arranged on the ends of the said transverse shafts.

Moreover, it is not necessary mechanically to drive the front propellers. They may also be self-rotating and be rotated by the flow created during the traveling of the vehicle.

Instead of the lift producing propellers illustrated in the drawing, also supporting surfaces of any standard design may be employed which may be tiltably arranged on the fuselage. In this instance, the righting of the vehicle will be effected by turning the supporting surfaces.

It is, of course, to be understood, that the present invention is, by no means, limited to the particular constructions shown in the drawings, but also comprises any modifications within the scope of the appended claims. Thus, the number of the lift producing propellers is not limited to three as illustrated in the drawings. Instead, also four or more lift producing propellers or supporting surfaces, of a combination of lift producing propellers and supporting surfaces, may be provided.

What I claim is:

1. An observation station in the form of a high speed near-surface vehicle provided with propelling means and lift producing means and having a fuselage with one end thereof adapted to house observation means, said propelling and lift producing means being tiltable relative to said fuselage so as to displace the center of gravity of said vehicle to cause said fuselage to move into a substantially upright position with said one end above the water surface.

2. An observation station in the form of a high speed near-surface vehicle provided with propelling means and lift producing means and having a fuselage with one end thereof adapted to house observation means, said propelling and lift producing means being formed by propellers immersed in the water during the traveling of the vehicle, said propelling and lift producing means being tiltable relative to said fuselage so as to displace the center of gravity of said vehicle to cause said fuselage to move into a substantially upright position with said one end above the water surface.

3. An observation station according to claim 1, in which the lift producing means are formed by water-immersed auto-rotating lift producing propellers.

4. An observation station according to claim 1, in which the lift producing means are formed by water-immersed lift producing surface means.

5. An observation station in the form of a high speed near-surface vehicle provided with propelling means and lift producing means and having a fuselage with a stern and a bow, first tiltable supporting means pivotally connected to said stern and tiltable about an axis transverse to the longitudinal axis of said fuselage, first propeller means supported by said first supporting means, said supporting means being tiltably connected to said fuselage for tilting about an axis substantially parallel to said first-mentioned axis but spaced therefrom in the direction toward said bow, second propeller means carried by said second supporting means, said first and second supporting means being tiltable so that their axes extend in the longitudinal direction of said fuselage thereby displacing the center of gravity of said vehicle to cause said fuselage to move into a substantially upright position with said bow above the water surface.

6. An observation station according to claim 5, in which said bow is designed as observation chamber adapted to receive observation means.

7. An observation station according to claim 5, in which said stern is designed as chamber adapted to receive underwater observation devices.

8. An observation station according to claim 1, in which said vehicle is fully immersible.

9. An observation station in the form of a high speed near-surface vehicle provided with first means for propelling said vessel and also provided with second means for imparting a lift to said vehicle so as to lift at least the major portion thereof out of the water, said observation station also having a fuselage with one end thereof adapted to house observation means, said first and second means being tiltable relative to said fuselage so as to displace the center of gravity of said vehicle to cause said fuselage to move into a substantially upright position with said one end above the water surface, at least one of said first and second means being adjustable to a negative angle of incidence to thereby cause said vehicle to be pressed under the water.

10. An observation station according to claim 1, which includes additional immersion tanks adapted to be flooded and also adapted to serve as trimming tanks.

11. An observation station in the form of a high speed near-surface vehicle provided with propelling means and lift producing means and having a fuselage with one end portion thereof adapted to house observation means, said propelling and lift producing means being tiltable relative to said fuselage so as to displace the center of gravity of said vehicle to cause said fuselage to move into a substantially upright position with said one end portion above the water surface, said fuselage being provided with a constriction arranged at approximately the waterline when said fuselage is in its substantially upright position.

12. An observation station according to claim 1, in which said vehicle is immersible and in which the angle of immersion of the vehicle relative to the vertical is adjustable at random in conformity with the center of gravity of said propelling means and said lift producing means.

No references cited.

MILTON BUCHLER, *Primary Examiner.*

T. M. BLIX, *Assistant Examiner.*